US007653391B2

United States Patent
Kobayashi et al.

(10) Patent No.: US 7,653,391 B2
(45) Date of Patent: Jan. 26, 2010

(54) MOBILE TERMINAL AND MOBILE COMMUNICATION METHOD

(75) Inventors: Motonari Kobayashi, Yokohama (JP); Toshihiro Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 468 days.

(21) Appl. No.: 11/248,278

(22) Filed: Oct. 13, 2005

(65) Prior Publication Data

US 2006/0084434 A1    Apr. 20, 2006

(30) Foreign Application Priority Data

Oct. 13, 2004    (JP)    ............................ P2004-299341

(51) Int. Cl.
*H04Q 7/20*    (2006.01)
(52) U.S. Cl. ..................... 455/435.1; 455/433; 455/519
(58) Field of Classification Search ............. 455/435.1, 455/428, 445, 456.1, 433, 403, 414, 456, 455/458, 550.1, 519
See application file for complete search history.

(56) References Cited

U.S. PATENT DOCUMENTS

| | | | | |
|---|---|---|---|---|
| 5,677,683 | A * | 10/1997 | Kawasaki et al. | ............ 370/351 |
| 7,039,027 | B2 * | 5/2006 | Bridgelall | .................... 370/329 |
| 2002/0058504 | A1 | 5/2002 | Stanforth | |
| 2003/0014187 | A1 * | 1/2003 | Chun et al. | .................. 701/209 |
| 2003/0016636 | A1 * | 1/2003 | Tari et al. | ..................... 370/328 |
| 2003/0235174 | A1 | 1/2003 | Pichna et al. | |
| 2003/0100294 | A1 * | 5/2003 | Hosono | ........................ 455/414 |
| 2003/0190029 | A1 * | 10/2003 | Marcus | ......................... 379/219 |
| 2004/0203769 | A1 * | 10/2004 | Sakanaba | ................. 455/435.1 |
| 2005/0031111 | A1 * | 2/2005 | Igarashi | .................. 379/210.02 |
| 2005/0153736 | A1 * | 7/2005 | Ganton | ..................... 455/553.1 |

(Continued)

FOREIGN PATENT DOCUMENTS

EP    1398910 A1    9/2002

(Continued)

OTHER PUBLICATIONS

Bharat Bhargava, et al., "Integrating Heterogeneous Wireless Technologies: A Cellular Aided Mobile Ad hoc Network (CAMA)", ACM Mobile Network and Applications, 2003, pp. 1-12.

(Continued)

*Primary Examiner*—CongVan Tran
(74) *Attorney, Agent, or Firm*—Oblon, Spivak, McClelland, Maier & Neustadt, L.L.P.

(57) ABSTRACT

A mobile terminal in a mobile communication system in which a server performs routing control based on registration information sent from the plurality of mobile terminals, including; an exchanging unit configured to exchange, with another mobile terminal, link information showing a link set in the another mobile terminal, and operational information showing whether the another mobile terminal is operating as a registering terminal which sends the registration information to the server or the another mobile terminal is operating as a non-registering terminal which does not send the registration information to the server; and a judgment unit configured to make a judgment on whether the mobile terminal should operate as the registering terminal or the mobile terminal should operate as the non-registering terminal, based on the link information and the operational information which are received from the another mobile terminal.

15 Claims, 12 Drawing Sheets

U.S. PATENT DOCUMENTS

2005/0164727 A1 * 7/2005 Hasegawa ............... 455/519
2006/0077956 A1 * 4/2006 Saksena et al. ............ 370/352

FOREIGN PATENT DOCUMENTS

EP       1648122 A1 *  4/2006
JP       7-30962        1/1995

OTHER PUBLICATIONS

T. Clausen, et al., "Optimized Link State Routing Protocol (OLSR)", Network Working Group RFC3626. URL:www.ietf.org/rfc/rfc3626.txt, Oct. 2003, pp. 1-75.

S. Roy et al., "Node-Centric Hybrid Routing for Ad-Hoc Wireless Extensions of the Internet", IEEE 2002 (O-7803-7632-3/02), pp. 183-187.

* cited by examiner

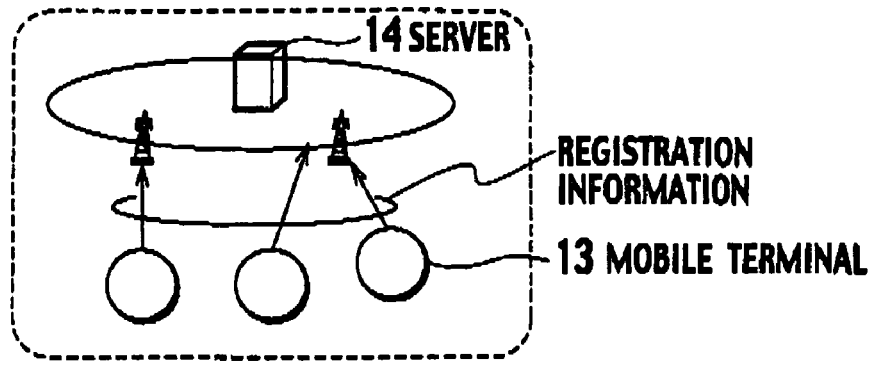
FIG. 1A
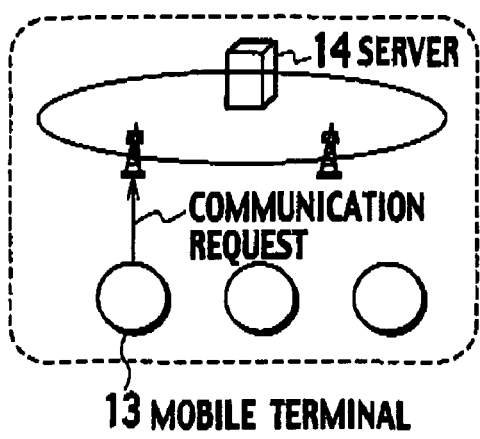
FIG. 1B
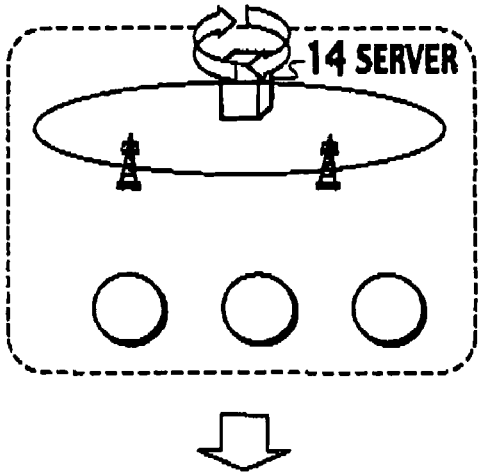
FIG. 1C
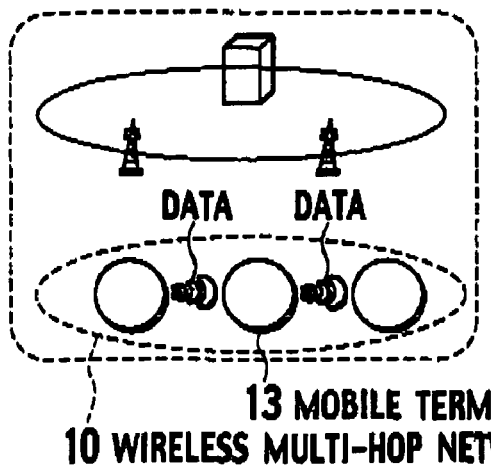
FIG. 1E
FIG. 1D

FIG. 4

| HELLO PACKET | | LINK INFORMATION #0 | REGISTRATION/ NON- REGISTRATION FLAG #0 | ---- | LINK INFORMATION #n | REGISTRATION/ NON- REGISTRATION FLAG #n | ---- |
|---|---|---|---|---|---|---|---|

FIG. 5A

| TERMINAL ID | NUMBER OF HOPS | REGISTRATION/ NON-REGISTRATION INFORMATION |
|---|---|---|
| MT#1 | 1 | REGISTRATION |
| ⋮ | ⋮ | ⋮ |
| MT#11 | 2 | NON-REGISTRATION |
| ⋮ | ⋮ | ⋮ |

FIG. 5B

| MT#0 - MT#1 |
|---|
| ⋮ |
| MT#1 - MT#11 |
| ⋮ |

30 REGISTERING TERMINAL
31 NON-REGISTERING TERMINAL

30b REGISTERING TERMINAL
LINK #1
30a REGISTERING TERMINAL
31a NON-REGISTERING TERMINAL
31b NON-REGISTERING TERMINAL

US 7,653,391 B2

MOBILE TERMINAL AND MOBILE COMMUNICATION METHOD

CROSS REFERENCE TO RELATED APPLICATION

This application is based upon and claims the benefit of priority from the prior Japanese Patent Application No. P2004-299341, filed on Oct. 13, 2004; the entire contents of which are incorporated herein by reference.

BACKGROUND OF THE INVENTION

1. Field of the Invention

The present invention relates to a mobile communication method in which a server performs routing control based on registration information sent from a plurality of mobile terminals, and to a mobile terminal used in the mobile communication method.

2. Description of the Related Art

A mobile communication method, in which a server in a core network such as a cellular network performs routing control based on a topology of a wireless multi-hop network, has been conventionally discussed.

With reference to FIGS. 1a to 1e, a description will be given of a conventional mobile communication method as described above.

Firstly, each mobile terminal 13 can grasp information showing a link state of a mobile terminal which is reachable within two hops, by regularly exchanging Hello packets, such as one used in the optimized link state routing protocol (OLSR), with another mobile terminal 13.

Secondly, as shown in FIG. 1A, each mobile terminal 13 sends registration information including identification information on an adjacent mobile terminal, its own identification information and its own location information, to a server 14 in a core network called the cellular aided mobile ad hoc network (CAMA) agent.

Here, the registration information is information necessary for the server 14 to manage a topology of a wireless multi-hop network 10. Incidentally, the location information is assumed to be obtained by GPS and the like.

Thirdly, as shown in FIG. 1B, the mobile terminal 13 requesting to start communication sends a communication request to the server 14.

Fourthly, as shown in FIG. 1C, the server 14, which has received the communication request, calculates a route related to the communication request based on the topology of the wireless multi-hop network 10 managed by itself.

Fifthly, as shown in FIG. 1D, the server 14 notifies the mobile terminal 13 which has requested the communication start, of the calculated route information.

Sixthly, as shown in FIG. 1E, the mobile terminal 13 sends data in the wireless multi-hop network 10 based on the route information notified from the server 14.

However, all mobile terminals 13 are required to access the server 14 in a core network 11 regularly or according to a change in a link state. Therefore, if the sending of the registration information to the core network 11 by the plurality of mobile terminals 13 often takes place, the processing amount of the server 14 increases. Thus, a communication amount between the server 14 and the mobile terminals 13 increases, and there has been a problem in that the amount of the power consumption of the mobile terminal 13 increases.

BRIEF SUMMARY OF THE INVENTION

The present invention has been made considering the problems, and its object is to provide a mobile communication method and a mobile terminal, which can suppress increases in a processing amount of a server 14, in a communication amount between the server 14 and a mobile terminal 13 and in the amount of power consumption of the mobile terminal 13, when the mobile terminal 13 sends registration information to the server 14.

A first aspect of the present invention is summarized as a mobile terminal in a mobile communication system in which a server performs routing control based on registration information sent from the plurality of mobile terminals, including: an exchanging unit configured to exchange, with another mobile terminal, link information showing a link set in the another mobile terminal, and operational information showing whether the another mobile terminal is operating as a registering terminal which sends the registration information to the server or the another mobile terminal is operating as a non-registering terminal which does not send the registration information to the server; and a judgment unit configured to make a judgment on whether the mobile terminal should operate as the registering terminal or the mobile terminal should operate as the non-registering terminal, based on the link information and the operational information which are received from the another mobile terminal.

In the first aspect, the judgment unit can be configured to make the judgment to form a network configuration in which at least one of the registering terminals is adjacent to the non-registering terminal.

In the first aspect, the judgment unit can be configured to judge that the mobile terminal should operate as the registering terminal, when the mobile terminal is the non-registering terminal, when the mobile terminal is not adjacent to the registering terminal, and when all mobile terminals adjacent to the mobile terminal are adjacent to at least one of the registering terminals.

In the first aspect, the judgment unit can be configured to judge that the mobile terminal should operate as the registering terminal, when the mobile terminal is the non-registering terminal, when the mobile terminal is not adjacent to the registering terminal, when at least one mobile terminal adjacent to the mobile terminal is not adjacent to the registering terminal, and when the number of the non-registering terminals adjacent to the mobile terminal is greater than the number of the non-registering terminals adjacent to mobile terminals which are not adjacent to the registering terminal adjacent to the mobile terminal.

In the first aspect, the judgment unit can be configured to judge that the mobile terminal should operate as the non-registering terminal, when the mobile terminal is the registering terminal, when the mobile terminal is adjacent to at least one of the registering terminals, and when all the non-registering terminals adjacent to the mobile terminal are adjacent to at least two of the registering terminals.

In the first aspect, the mobile terminal can include a registration unit configured to: send the registration information of the non-registering terminal adjacent to the mobile terminal to the server; send the registration information of the registering terminal adjacent to the mobile terminal to the server, when the number of the non-registering terminals adjacent to the mobile terminal is greater than the number of the non-registering terminals adjacent to the registering terminals adjacent to the mobile terminal; and send the registration information of the registering terminal adjacent to the mobile terminal to the server, when the number of the non-registering terminals adjacent to the mobile terminal is equal to the number of the non-registering terminals adjacent to the registering terminal adjacent to the mobile terminal, and when the number of the registering terminals adjacent to the mobile terminal is equal to or greater than the number of the registering terminals adjacent to the registering terminal adjacent to the mobile terminal.

In the first aspect, the mobile terminal can include a registration unit configured to send to the server the registration information of a two-hop mobile terminal which is reachable in two hops from the mobile terminal or of one mobile terminal existing on all paths to the two-hop mobile terminal, when the two-hop mobile terminal is the non-registering terminal which is not reachable in one hop, and when the registering terminal does not exist on all paths to the two-hop mobile terminal.

In the first aspect, the mobile terminal can include a registration unit configured to send to the server the registration information of a two-hop mobile terminal which is reachable in two hops from the mobile terminal and of all the non-registering terminals existing all paths to the two-hop mobile terminal, when the two-hop mobile terminal is the non-registering terminal, and when at least one of the non-registering terminals exists on all paths to the two-hop mobile terminal.

In the first aspect, the judgment unit can be configured to make the judgment to form a network configuration in which all mobile terminals adjacent to the non-registering terminal are the registering terminals.

In the first aspect, the judgment unit can be configured to select the non-registering terminal to shift to the registering terminal, when the mobile terminal is adjacent to the non-registering terminal.

In the first aspect, the non-registering terminal to shift to the registering terminal can be determined based on the number of the adjacent non-registering terminals and the number of the adjacent registering terminals.

In the first aspect, the judgment unit can be configured to judge that the mobile terminal should operate as the non-registering terminal, when the mobile terminal is the registering terminal, when all mobile terminals adjacent to the mobile terminal are the registering terminals, and when all the registering terminals adjacent to the mobile terminal are adjacent to at least one of the non-registering terminals.

In the first aspect, the judgment unit can be configured to judge that the mobile terminal should operate as the non-registering terminal, when the mobile terminal is the registering terminal, when all mobile terminals adjacent to the mobile terminal are the registering terminals, when at least one mobile terminal adjacent to the mobile terminal is not adjacent to the non-registering terminal, and when the number of the registering terminals adjacent to the mobile terminal is greater than the number of the registering terminals adjacent to the registering terminal adjacent to the mobile terminal.

In the first aspect, the mobile terminal can include a registration unit configured to: send to the server the registration information of the non-registering terminal adjacent to the mobile terminal; send to the server the registration information of the registering terminal adjacent to the mobile terminal, when the number of the non-registering terminals adjacent to the mobile terminal is greater than the number of the non-registering terminals adjacent to the registering terminal adjacent to the mobile terminal; and send to the server the registration information of the registering terminal adjacent to the mobile terminal, when the number of the non-registering terminals adjacent to the mobile terminal is equal to the number of the non-registering terminals adjacent to the registering terminal adjacent to the mobile terminal, and when the number of the registering terminals adjacent to the mobile terminal is equal to or greater than the number of the registering terminals adjacent to the registering terminal adjacent to the mobile terminal.

A first aspect of the present invention is summarized as a mobile communication method, including: causing a mobile terminal to exchange, with another mobile terminal, link information showing a link set in the another mobile terminal, and operational information showing whether the another mobile terminal is operating as a registering terminal which sends the registration information to a server or the another mobile terminal is operating as a non-registering terminal which does not send the registration information to the server; causing the mobile terminal to make a judgment on whether the mobile terminal should operate as the registering terminal or the mobile terminal should operate as the non-registering terminal, based on the link information and the operational information which have been received from the another mobile terminal; and causing the server to perform routing control based on the registration information sent from the registering terminal.

BRIEF DESCRIPTION OF THE SEVERAL VIEWS OF THE DRAWINGS

FIGS. 1A to 1E are views for explaining the operations of a conventional mobile communication system.

FIG. 4 is a view showing an example of Hello packets which are sent and received by the mobile terminal according to the first embodiment of the present invention, FIGS. 5A and 5B are views showing an example of contents managed by a link state manager unit of the mobile terminal of the first embodiment of the present invention.

DETAILED DESCRIPTION OF THE INVENTION

Configuration of Mobile Communication System According to First Embodiment of the Present Invention With reference to FIGS. 2 to 7, a description will be given of the configuration of a mobile communication system according to a first embodiment of the present invention. The mobile communication system according to this embodiment is configured that a server 14 performs routing control based on registration information sent from a plurality of mobile terminals 13.

Figure 2:
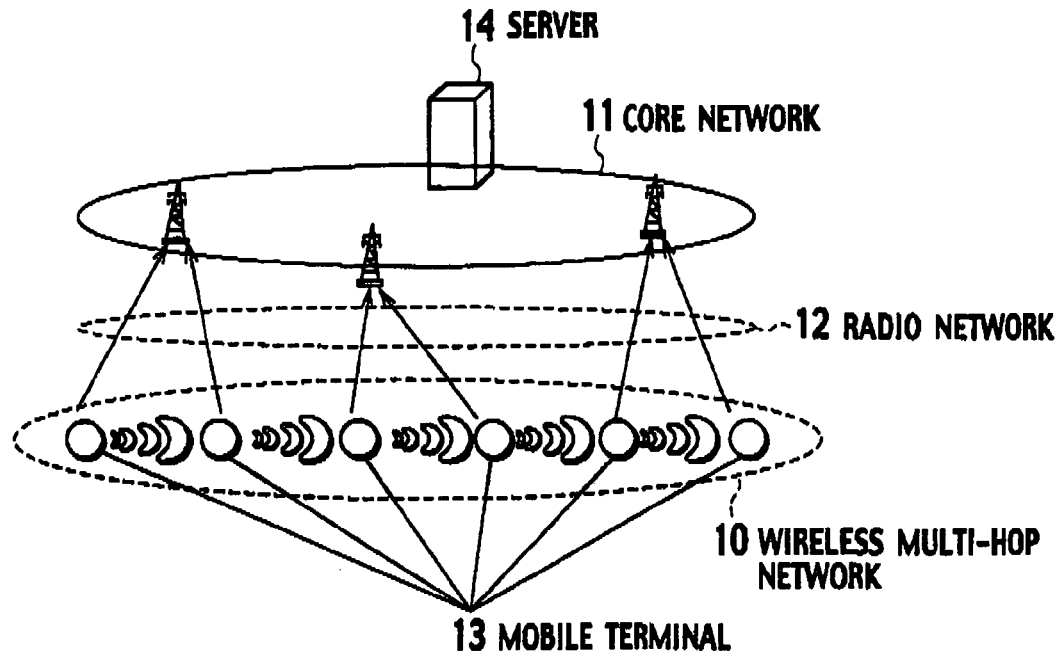
FIG. 2 is an entire configuration diagram of a mobile communication system according to first and second embodiments of the present invention.

As shown in FIG. 2, the mobile communication system according to this embodiment includes a wireless multi-hop network 10, a core network 11, a radio network 12 and the plurality of mobile terminals 13 and the server 14.

The wireless multi-hop network 10 is a radio network formed by direct communications between mobile terminals, which is generally called an ad hoc network.

The core network 11 and the radio network 12 are formed by a cellular network having a wide area, for example. Note that the Internet may be used as the core network 11, and a wireless LAN may be used as the radio network 12.

The mobile terminal 13 is a communication device which can be carried around, such as a portable phone terminal, PDA or a note personal computer.

Figure 3:
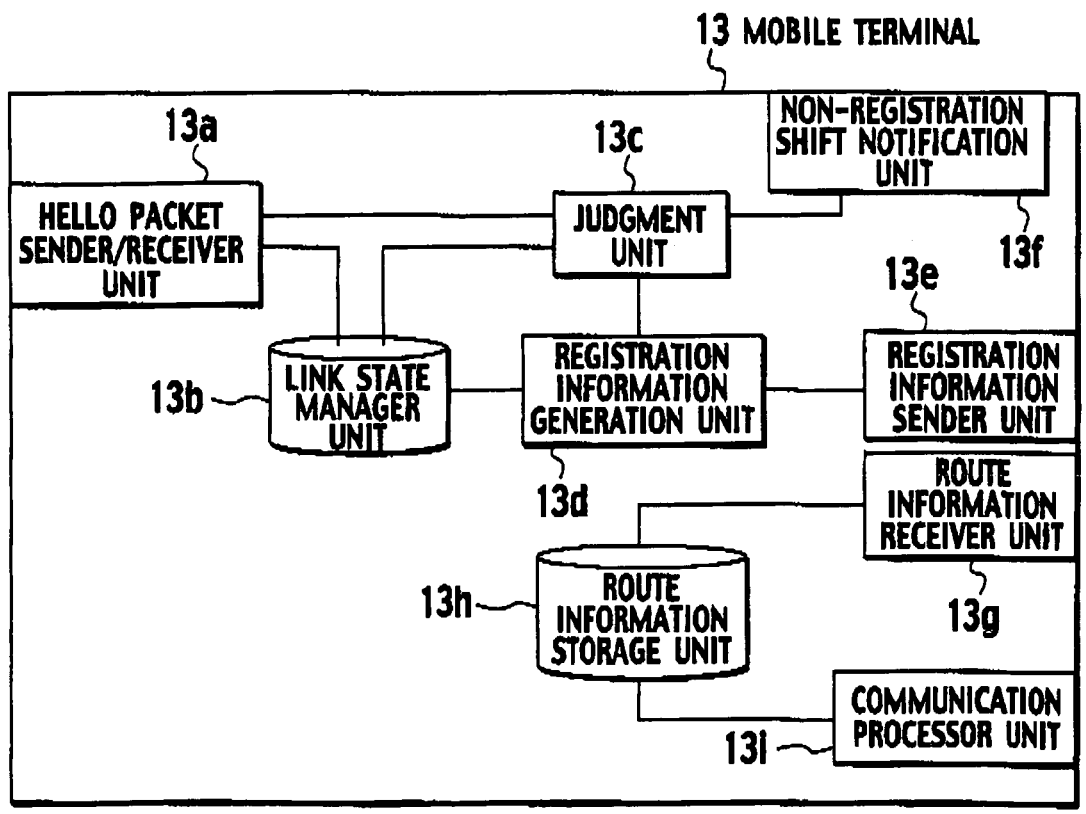
FIG. 3 is a functional block diagram of a mobile terminal according the first embodiment of the present invention.

As shown in FIG. 3, the mobile terminal 13 according to this embodiment includes a Hello packet sender/receiver unit 13a, a link state manager unit 13b, a judgment unit 13c, a registration information generation unit 13d, a registration information sender unit 13e, a non-registration shift notification unit 13f, a route information receiver unit 13g, a route information storage unit 13h and a communication processor unit 13i.

The Hello packet sender/receiver unit 13a is configured to exchange Hello packets by direct communications between adjacent mobile terminals, in the wireless multi-hop network 10. Here, an example of the Hello packets sent and received by the Hello packet sender/receiver unit 13a is shown in FIG. 4.

As shown in FIG. 4, the Hello packet includes "link information" showing links set in each mobile terminal 13 and "a registration/non-registration flag (operational information)" showing whether each mobile terminal is "a registering terminal" or a "non-registering terminal". Here, the link information may show the identification information of each link or may show the identification information of the mobile terminal being the connected party of each link.

Note that "the registering terminal" indicates the mobile terminal 13 which operates in a manner of sending the registration information to the server 14, and "the non-registering terminal" indicates the mobile terminal which does not operate in a manner of not sending the registration information to the server 14.

Note that the Hello packet sender/receiver unit 13a may be configured to regularly send the Hello packets.

The link state manager unit 13b is configured to manage a link state in a two-hop mobile terminal which is reachable within two hops, based on the Hello packet received from an adjacent mobile terminal.

Specifically, as shown in FIG. 5A, the link state manager unit 13b manages "a terminal ID" of a two-hop mobile terminal which is reachable within two hops, "the number of hops" to reach the two-hop mobile terminal and "registration/non-registration information (operational information)" showing whether the two-hop mobile terminal is the registering or the non-registering terminal, while associating the three of them.

Moreover, as shown in FIG. 5B, the link state manager unit 13b manages all link information set in two-hop mobile terminals which are managed by FIG. 5A.

The judgment unit 13c is configured to make a judgment whether the mobile terminal (its own) 13 operates as the registering terminal or the non-registering terminal, based on the link state managed by the link state manager unit 13b.

Figure 6A:
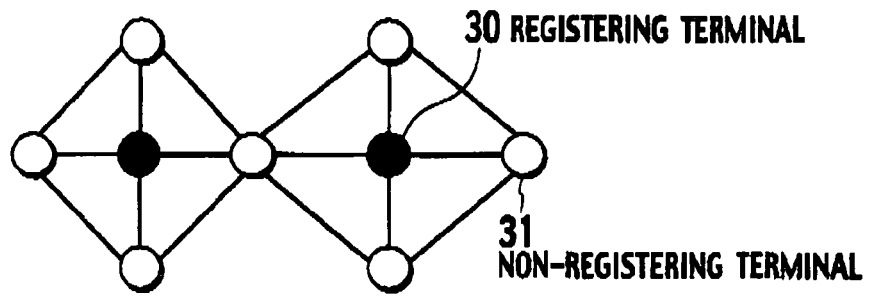
FIGS. 6A and 6B are views for explaining a topology in the mobile communication system according to the first embodiment of the present invention.
Figure 6B:
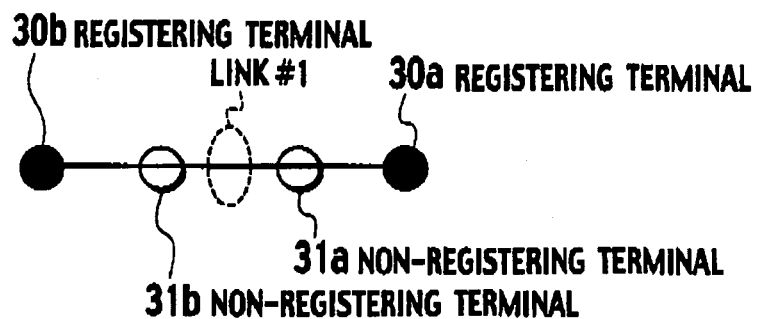

Specifically, in this embodiment, the judgment unit 13c makes the foregoing judgment in a manner of forming "a network configuration in which at least one registering terminal is adjacent to the non-registering terminal". FIGS. 6A and 6B show an example of the network configuration.

In the network configuration of FIG. 6A, the registration information of a non-registering terminal 31 is registered with the server 14 by an adjacent registering terminal 30. Hence, the registration information of all mobile terminals is guaranteed to be registered with the server 14.

Further more, also in the network configuration of FIG. 6B, since the Hello packet includes "link information" and "operational information", registering terminals 30a and 30b can grasp information on Link #1 between non-registering terminals 31a and 31b.

Thus, the segmentation of the wireless multi-hop network 10 can be prevented by sending the information on the Link #1, too, as the registration information to the server 14.

Note that the judgment unit 13c may be configured to regularly make the foregoing judgment, or may be configured to make the foregoing judgment when receiving the Hello packet and confirming a change in the link state.

The registration information generation unit 13d is configured to generate the registration information necessary for the server 14 to manage a topology with reference to the link state manager unit 13b, when the mobile terminal 13 is judged by the judgment unit 13c to operate as the registering terminal.

For example, the registration information includes the information shown in FIGS. 5A and 5B. In addition, the registration information may include the location information of the mobile terminal 13, which is obtained by GPS and the like, The registration information sender unit 13e is configured to send to the server 14 the registration information generated by the registration information generation unit 13d at a predetermined timing.

Note that the registration information sender unit 13e may be configured to regularly send the registration information to the server 14, may be configured to send the registration information to the server 14 when there is a change in the link state managed by the link state manager unit 13b, or may be configured to send the registration information to the server 14 when the mobile terminal 13 moves a certain distance.

Moreover, the registration information sender unit 13e is configured to autonomously select the registration information (the link information and the operational information) of an adjacent non-registering terminal, the information being sent to the server 14, in order that information on one content is not redundantly registered with the server 14. Note that the selection may be made by the registration information generation unit 13d.

The non-registration shift notification unit 13f is configured to notify the server 14 of a judgment result, when the mobile terminal 13 is judged by the judgment unit 13c to operate as the non-registering terminal.

The route information receiver unit 13g is configured to receive from the server 14 route information showing a routing method of data in the wireless multi-hop network 10.

The route information storage unit 13h is configured to store the route information received by the route information receiver unit 13g.

The communication processor unit 13i is configured to perform the sending and receiving of data in the wireless multi-hop network 10, based on the route information stored by the route information storage unit 13h. Furthermore, the communication processor unit 13i is configured to send a communication request to the server 14.

As described above, the mobile terminal 13 includes a function of communicating within the wireless multi-hop network 10, and a function of communicating with the server 14 through the radio network 12 and the core network 11.

Here, the mobile terminal 13 may be configured to include each of the functions of communicating within the wireless multi-hop network 10 and of communicating with the server 14, may be configured to include the function of communicating within the plurality of wireless multi-hop networks 10, may be configured to include the function of communicating with the plurality of servers 14, or may be configured to include the functions of communicating within the wireless multi-hop network 10 and communicating with the server 14 as a common radio communication function.

Figure 7:
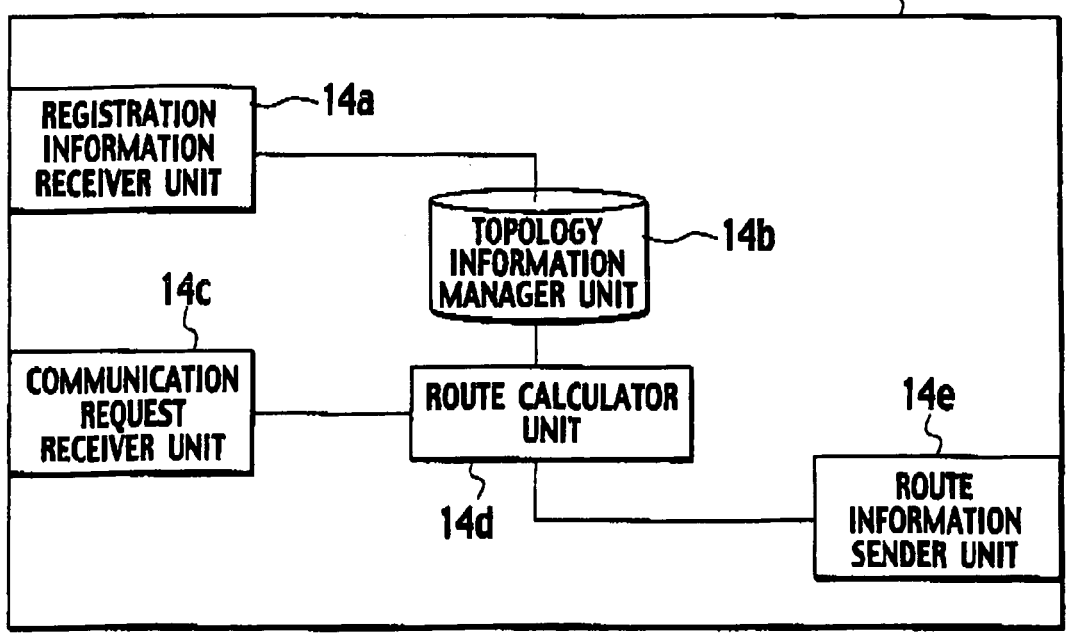
FIG. 7 is a functional block diagram of a server according to the first embodiment of the present invention.

As shown in FIG. 7, the server 14 according to this embodiment includes a registration information receiver unit 14a, a topology information manager unit 14b, a communication request receiver unit 14c, a route calculator unit 14d and a route information sender unit 14e.

Note that the server 14 according to this embodiment is configured to perform the routing control based on the registration information sent from the plurality of mobile terminals 13.

The registration information receiver unit 14a is configured to receive the registration information sent from the mobile terminal 13 through the radio network 12 and the core network 11.

The topology information manager unit 14b is configured to manage a network configuration (a topology) of the wireless multi-hop network 10, based on the registration information received from the registration information receiver unit 14a.

The communication request receiver unit 14c is configured to receive a communication request sent from the mobile terminal 13 through the radio network 12 and the core network 11.

The route calculator unit 14d is configured to calculate route information related to communication with reference to the topology information manager unit 14b, when receiving a communication request from the mobile terminal 13.

Note that the route calculator unit 14d may be configured to spontaneously calculate the route information at a predetermined timing.

The route information sender unit 14e is configured to send the route information calculated by the route calculator unit 14d to the mobile terminal 13.

Note that the route information sender unit 14e may be configured to send the route information to the mobile terminal 13 which has sent the communication request, or may be configured to send the route information to all mobile terminals on the calculated route (path).

In the former case, the mobile terminal 13 is configured to perform the sending of data by source routing. In the latter case, the mobile terminal 13 is configured to perform the sending of data by table-driven routing.

Operations of Mobile Communication System According to First Embodiment of the Present Invention With reference to FIGS. 8 to 11, a description will be given of the operations of the mobile communication system according to the first embodiment of the present invention.

Firstly, with reference to FIG. 8, a description will be given of the operations of when the mobile terminal 13 operating as the non-registering terminal shifts to the registering terminal.

In this embodiment, a condition that "at least one registering terminal is adjacent to the non-registering terminal" is assumed to be satisfied in the wireless multi-hop network 10.

Figure 8:
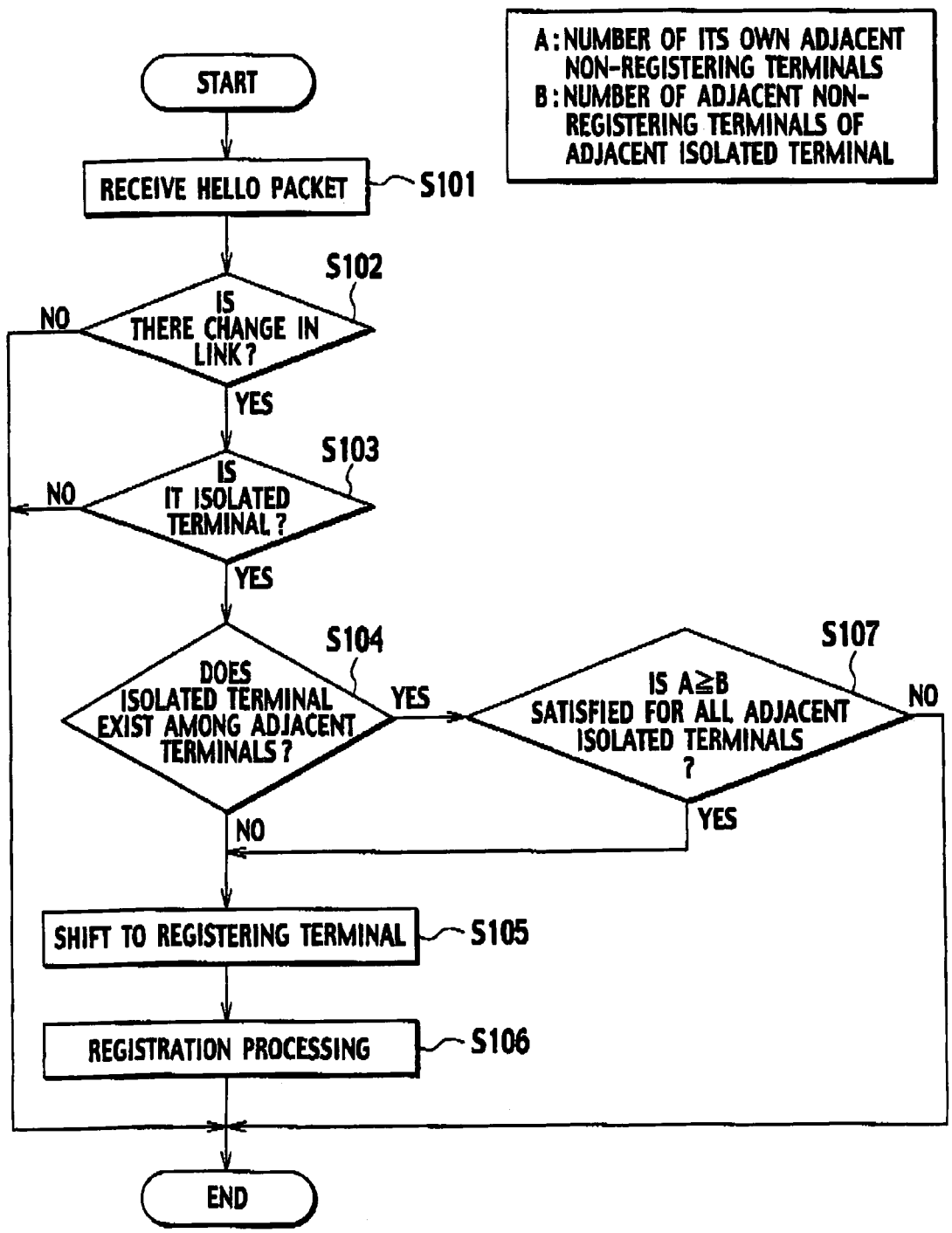
FIG. 8 is a flow chart showing the operations of the mobile communication system according to the first embodiment of the present invention.

As shown in FIG. 8, in Step S101, the Hello packet sender/receiver unit 13a of the mobile terminal 13 receives the Hello packet from an adjacent mobile terminal in the wireless multi-hop network 10.

In Step S102, the judgment unit 13c of the mobile terminal 13 judges whether or not there has been a change in the link state of a two-hop mobile terminal which is reachable within two hops, with reference to the received Hello packet and the link state managed by the link state manager unit 13b.

When there is no change in the link state, the operation is to be terminated without the mobile terminal 13's shifting to the registering terminal. On the other hand, when there is a change in the link state, the operation moves on to Step S103.

In Step S103, the judgment unit 13c of the mobile terminal 13 judges whether or not the relevant mobile terminal 13 is "an isolated terminal". Here, the isolated terminal indicates a mobile terminal whose adjacent mobile terminals (adjacent terminals) are all non-registering terminals, that is, a mobile terminal which is not adjacent to the registering terminals.

If the mobile terminal 13 is not the isolated terminal, the operation is to be terminated without the mobile terminal 13's shifting to the registering terminal. On the other hand, if it is the isolated terminal, the operation moves on to Step S104.

In Step S104, the judgment unit 13c of the mobile terminal 13 judges whether or not the isolated terminal exists among the adjacent mobile terminals (the adjacent terminals). In other words, the judgment unit 13c of the mobile terminal 13 judges whether or not all mobile terminals adjacent to the relevant mobile terminal 13 are adjacent to the registering terminals.

When all mobile terminals adjacent to the relevant mobile terminal 13 are adjacent to at least one registering terminal (in the case of "NO" in Step S104), the operation moves on to Step S105. When at least one mobile terminal adjacent to the relevant mobile terminal 13 is not adjacent to the registering terminal (in the case of "YES" in step S104), the operation moves on to Step S107.

In Step S105, the judgment unit 13c of the mobile terminal 13 judges that the relevant mobile terminal 13 should shift to the registering terminal.

In Step S106, the registration information sender unit 13e of the mobile terminal 13 sends to the server 14 the registration information of the relevant mobile terminal 13, which is generated by the registration information generation unit 13d.

In Step S107, when the isolated terminal exists among the adjacent terminals, it means that there exist a plurality of choices of mobile terminals to shift to the registering terminals. Therefore, it is necessary to judge which mobile terminal should shift to the registering terminal.

For this reason, the judgment unit 13c of the mobile terminal 13 judges over all the adjacent isolated terminals whether or not the number of the non-registering terminals adjacent to the relevant mobile terminal 13 (the number A of its own adjacent non-registering terminals) is greater than (or equal to) the number of the non-registering terminals adjacent to mobile terminals (the adjacent isolated terminals) which are not adjacent to the registering terminals adjacent to the relevant mobile terminal 13 (the number B of the adjacent non-registering terminals of the adjacent isolated terminals).

In other words, the judgment unit 13c of the mobile terminal 13 judges whether or not the number of the non-registering terminals adjacent to itself is the largest compared to the number of the non-registering terminals adjacent to all adjacent isolated terminals.

When the judgment result is affirmative, the operation moves on to Step S105. When the judgment result is negative, the operation is to be terminated without the mobile terminal 13's shifting to the registering terminal.

Secondly, with reference to FIG. 9, a description will be given of the operations of when the mobile terminal 13 operating as the registering terminal shifts to the non-registering terminal.

In this embodiment, a condition that "at least one registering terminal is adjacent to the non-registering terminal" is assumed to be satisfied in the wireless multi-hop network 10.

Figure 9:
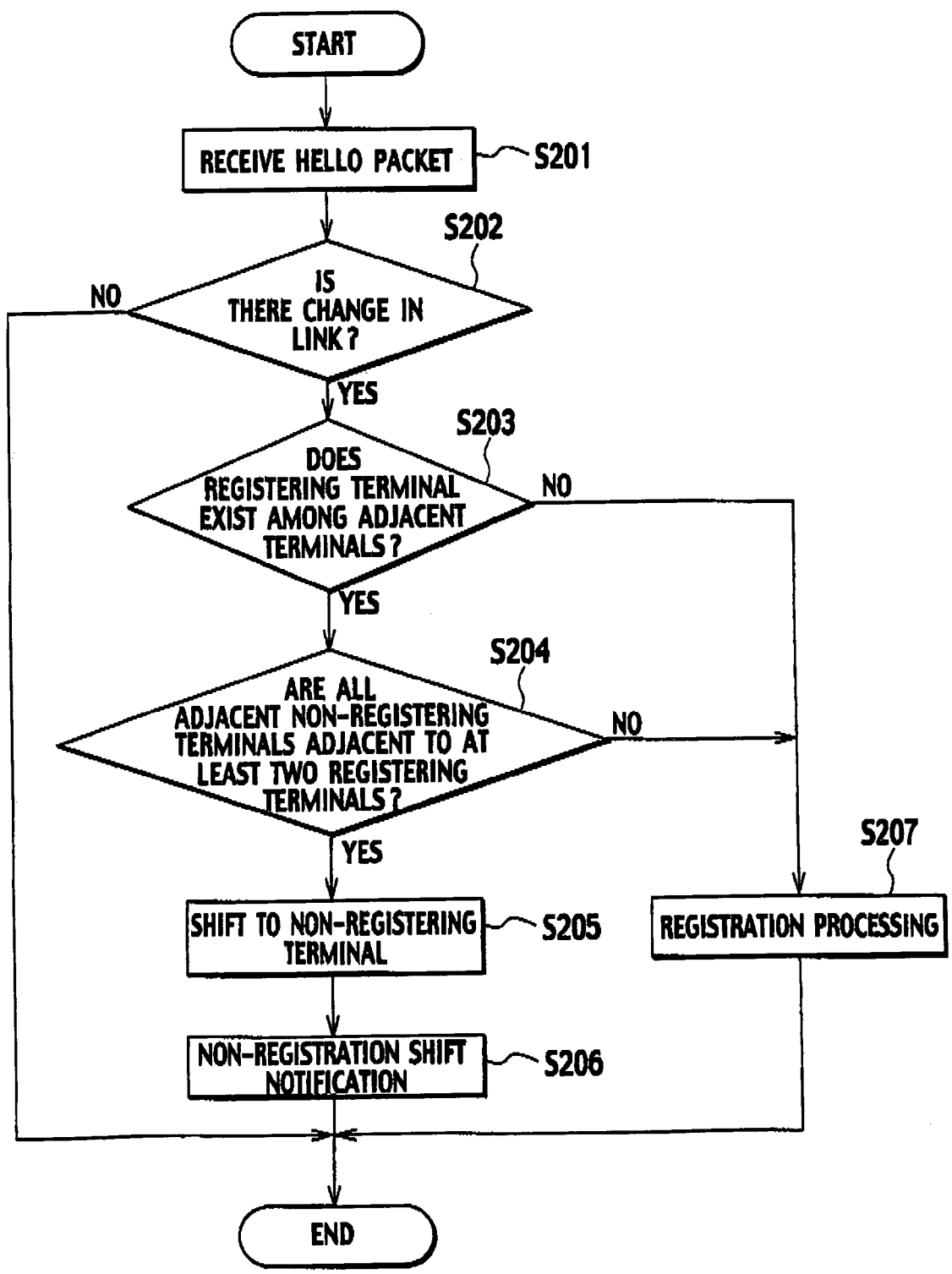
FIG. 9 is a flow chart showing the operations of the mobile communication system according to the first embodiment of the present invention.

As shown in FIG. 9, in Step S201, the Hello packet receiver unit 13a of the mobile terminal 13 receives the Hello packet from the adjacent mobile terminal in the wireless multi-hop network 10.

In Step S202, the judgment unit 13c of the mobile terminal 13 judges whether or not there has been a change in the link state of the two-hop mobile terminal which is reachable within two hops, with reference to the received Hello packet and the link state managed by the link state manager unit 13b.

If there is no change in the link state, the mobile terminal 13 does not shift to the non-registering terminal, and thus the operation is to be terminated. On the other hand, if there is a change in the link state, the operation moves on to Step S203.

In Step S203, the judgment unit 13c of the mobile terminal 13 judges whether or not the registering terminal exists among the adjacent terminals, that is, whether or not the relevant mobile terminal 13 is adjacent to at least one registering terminal.

When the judgment result is affirmative, the operation moves on to Step S204. When the judgment result is negative, the operation moves on to Step S207.

In Step S204, the judgment unit 13c of the mobile terminal 13 judges whether or not all non-registering terminals adjacent to the relevant mobile terminal 13 are adjacent to at least two registering terminals.

When the judgment result is affirmative, the operation moves on to Step S205. When the judgment result is negative, the operation moves on to Step S207.

In Step S205, even if the relevant mobile terminal 13 becomes the non-registering terminal, the adjacent non-registering terminals are still adjacent to at least one registering terminal. Therefore, the adjacent non-registering terminals 13 do not become the isolated terminals.

Hence, the judgment unit 13c of the relevant mobile terminal 13 judges that the relevant mobile terminal 13 should shift to the non-registering terminal. Then, in Step S206, the non-registration shift notification unit 13f of the relevant mobile terminal 13 notifies the server 14 of the judgment result to that effect.

In Step S207, since the relevant mobile terminal 13 being the registering terminal becomes the non-registering terminal, the above-mentioned conditions are not fulfilled.

Accordingly, the judgment unit 13c of the relevant mobile terminal 13 judges that the relevant mobile terminal 13 should operate as the registering terminal, and thus the registration information sender unit 13e of the relevant mobile terminal 13 sends the registration information of the relevant mobile terminal 13 to the server 14.

Figure 10:
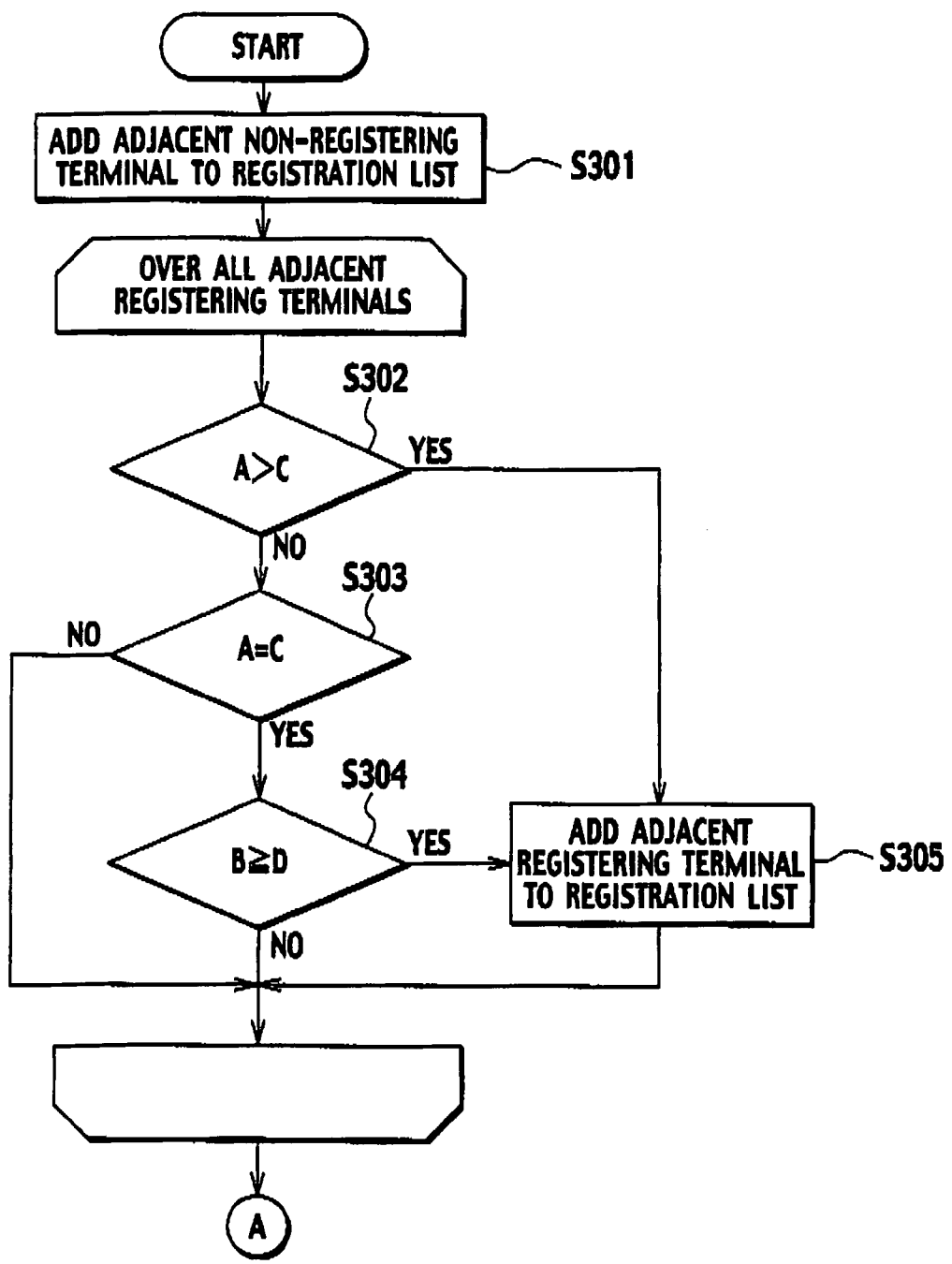
FIG. 10 is a flow chart showing the operations of the mobile communication system according to the first embodiment of the present invention.

Thirdly, with reference to FIGS. 10 and 11, a description will be given of the operation in which the mobile terminal 13 operating as the registering terminal autonomously selects the registration information (the link information and the operational information) to be sent to the server 14 in order that the information on one link is not redundantly registered with the server 14.

In Step S301, the registration information generation unit 13e (or the registration information sender unit 13d) of the mobile terminal 13 adds the registration information of the non-registering terminal (the adjacent non-registering terminal) which is adjacent to the relevant mobile terminal 13 to a registration list as the registration information to be sent to the server 14.

Next, the registration information generation unit 13e of the mobile terminal 13 judges over all the adjacent registering terminals whether or not the adjacent registering terminals are added to the registration list by repeating Steps S302 to S305.

Here, when the opposing registering terminals do not register with the server 14 the other's registration information one another, the information on the link between the relevant registering terminals is not registered with the server 14.

On the contrary, when the opposing registering terminals register with the server 14 the other's registration information one another, the information on the link between the relevant registering terminals is redundantly registered with the server 14, which is inefficient. Therefore, the above-mentioned judgment is required to be made.

In Step S302, the registration information generation unit 13e of the mobile terminal 13 judges whether or not the number of the non-registering terminals adjacent to the relevant mobile terminal 13 (the number A of its own adjacent non-registering terminals) is greater than the number of the non-registering terminals adjacent to the registering terminal (the adjacent registering terminal) which is adjacent to the relevant mobile terminal 13 (the number C of the adjacent non-registering terminals of the adjacent registering terminal).

When the judgment result is affirmative, the operation moves on to Step S305, and then the registration information generation unit 13e of the mobile terminal 13 moves on to a judgment on the next adjacent registering terminal after adding the registration information of the relevant adjacent registering terminal to the registration list.

On the other hand, when the judgment result is negative, the operation moves on to Step S303, and the registration information generation unit 13e of the mobile terminal 13 judges whether or not the number of the non-registering terminals adjacent to the relevant mobile terminal 13 (the number A of its own adjacent non-registering terminals) is equal to the number of the non-registering terminals adjacent to the registering terminals (the adjacent registering terminal) which is adjacent to the relevant mobile terminal 13 (the number C of the adjacent non-registering terminals of the adjacent registering terminal).

When the judgment result is negative, the registration information generation unit 13e of the mobile terminal 13 moves on to the judgment on the next adjacent registering terminal without adding the registration information of the relevant adjacent registering terminal to the registration list.

When the judgment result is affirmative, the operation moves on to Step S304, and then the registration information generation unit 13e of the mobile terminal 13 judges whether or not the number of the registering terminals adjacent to the relevant mobile terminal 13 (the number B of its own adjacent registering terminals) is equal to or greater than the number of the registering terminals adjacent to the registering terminal (the adjacent registering terminal) which is adjacent to the relevant mobile terminal 13 (the number D of the adjacent registering terminals of the adjacent registering terminal).

When the judgment result is negative, the registration information generation unit 13e of the mobile terminal 13 moves on to the judgment on the next adjacent registering terminal without adding the registration information on the relevant adjacent registering terminal to the registration list.

On the other hand, when the judgment result is affirmative, the operation moves on to Step S305, and then the registration information generation unit 13e of the mobile terminal 13 moves on to the judgment on the next adjacent registering terminal after adding the registration information of the relevant adjacent registering terminal to the registration list.

Figure 11:
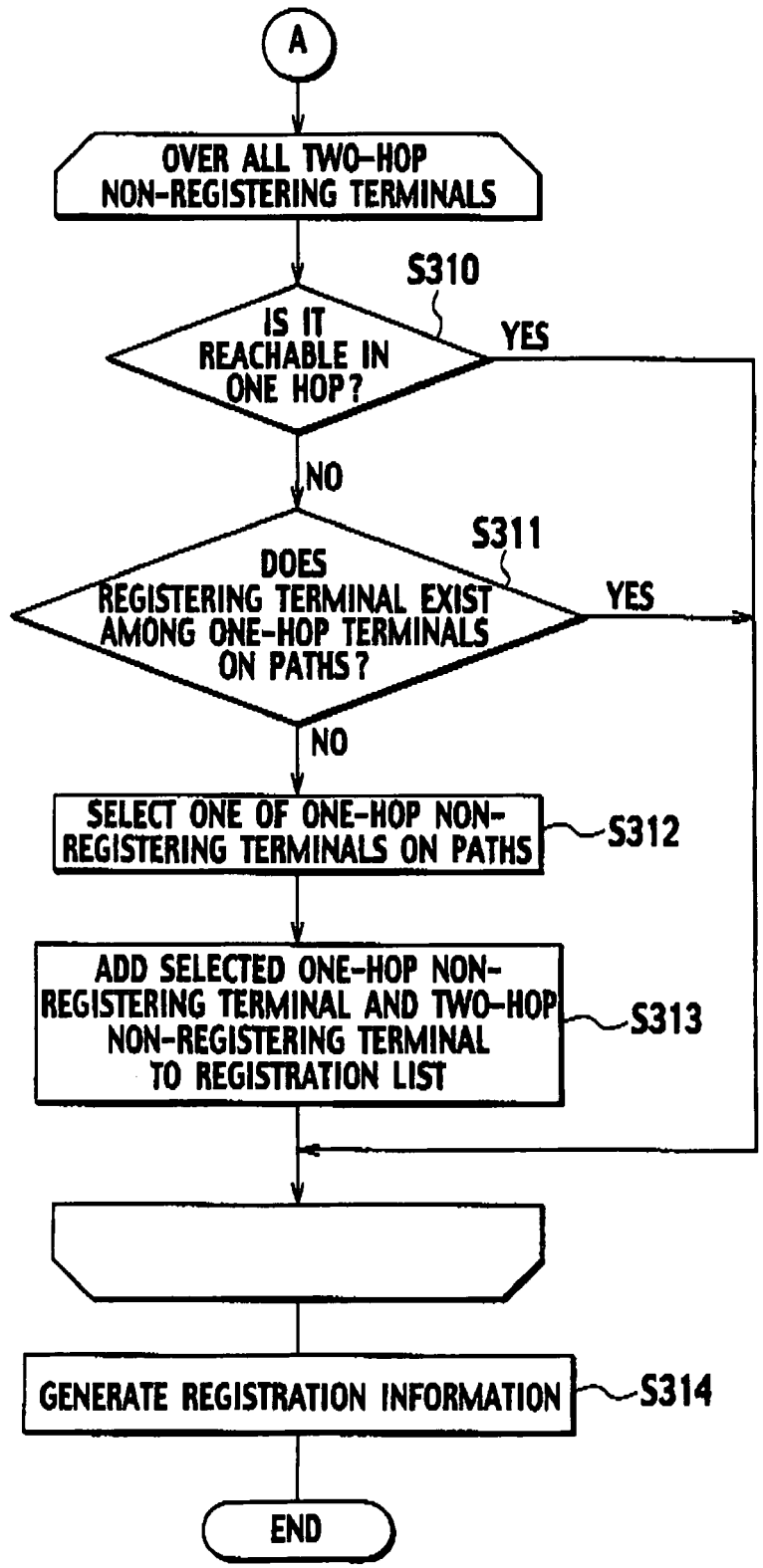
FIG. 11 is a flow chart showing the operations of the mobile communication system according to the first embodiment of the present invention.

Next, as shown in FIG. 11, the registration information generation unit 13e of the mobile terminal 13 judges over all non-registering terminals (two-hop non-registering terminals) which are reachable within two hops from the relevant mobile terminal 13 whether or not to add the two-hop non-registering terminals to the registration list by repeating Steps S310 to S313.

In Step S310, the registration information generation unit 13e of the mobile terminal 13 judges whether or not to be reachable to the relevant two-hop non-registering terminal in one hop with reference to the link state manager unit 13b.

When the judgment result is affirmative, the registration information generation unit 13e of the mobile terminal 13 moves on to a judgment on the next two-hop non-registering terminal without registering the relevant two-hop non-registering terminal in the registration list.

On the other hand, when the judgment result is negative, the operation moves on to Step S311, and then the registration information generation unit 13e of the mobile terminal 13 judges whether or not the registering terminals exist on all the paths to the mobile terminal (the relevant two-hop non-registering terminal) which is reachable in two hops from the relevant mobile terminal 13.

When the registering terminals are judged to be existent (in the case of "YES" in Step S311), the registration information generation unit 13e of the mobile terminal 13 moves on to the judgment on the next two-hop non-registering terminal without registering the relevant two-hop non-registering terminals in the registration list.

On the other hand, when the registering terminals are judged not to be existent (in the case of "NO" in Step S311), the operation moves on to Step S312, and then the registration information generation unit 13e of the mobile terminal 13 selects one mobile terminal (the non-registering terminal) existing on all the paths to the mobile terminals which are reachable in two hops from the relevant mobile terminal 13.

In Step S313, the registration information generation unit 13e of the mobile terminal 13 adds to the registration list the registration information on the non-registering terminals which are reachable in two hops from the relevant mobile terminal 13 and the selected non-registering terminals.

In Step S314, the registration information generation unit 13e of the mobile terminal 13 sends to the server 14 predetermined registration information and the identification information of the relevant mobile terminal 13, based on the registration list to which the registration information has been added as described above.

Operations and Effects of Mobile Communication System According to First Embodiment of the Present Invention According to the mobile communication system of the first embodiment of the present invention, each mobile terminal 13 uses information obtained by use of the Hello packet, thus autonomously performing shifts to the registering and non-registering terminals, a selection of the registration information and the like.

For this reason, the following is made possible; the number of mobile terminals sending registration information is suppressed; the number of simultaneous accesses to a server is decreased on sending the registration information; and the load on the server is reduced.

Moreover, according to the mobile communication system of the first embodiment of the present invention, since it is possible to decrease the number of the registrations of the redundant information on the link with the server 14, the data amount flowing between the mobile terminal 13 and the server 14 can be decreased.

Furthermore, the mobile communication system of the first embodiment of the present invention, the frequency of sending the registration information of each mobile terminal and the data amount of the registration information are decreased. Hence, the power consumption of the mobile terminal can be decreased.

According to the mobile communication system of the first embodiment of the present invention, each mobile terminal 13 can grasp a network configuration based on the link information and the operation information, and can autonomously make a judgment whether the relevant mobile terminal 13 become the registering terminal or the non-registering terminal.

According to the mobile communication system of the first embodiment of the present invention, since the registration information of the non-registering terminal is registered with the server 14 in the core network 11 by the adjacent registering terminal, the registration information of the all the mobile terminals is guaranteed to be registered with the server 14 in the core network 11.

According to the mobile communication system of the first embodiment of the present invention, the non-registering terminal can autonomously shift to the registering terminal with keeping the required network configuration, in accordance with the judgment result by the judgment unit 13c.

According to the mobile communication system of the first embodiment of the present invention, the registering terminal can autonomously shift to the non-registering terminal with keeping the required network configuration, in accordance with the judgment result by the judgment unit 13c.

According to the mobile communication system of the first embodiment of the present invention, it is possible to prevent from redundantly registering information on links between the adjacent registering terminals.

According to the mobile communication system of the first embodiment of the present invention, it is possible to prevent the segmentation of the wireless multi-hop network 10, and to calculate at least one route between any mobile terminals, by the registration unit of the two-hop mobile terminal which is reachable in two hops from the mobile terminal.

According to the mobile communication system of the first embodiment of the present invention, it is possible to guarantee that link information among all the mobile terminals is registered with the server 14 in the core network 11, and to calculate an optimized route, by the registration unit of the two-hop mobile terminal which is reachable in two hops from the mobile terminal.

First Modification Example

Figure 12:
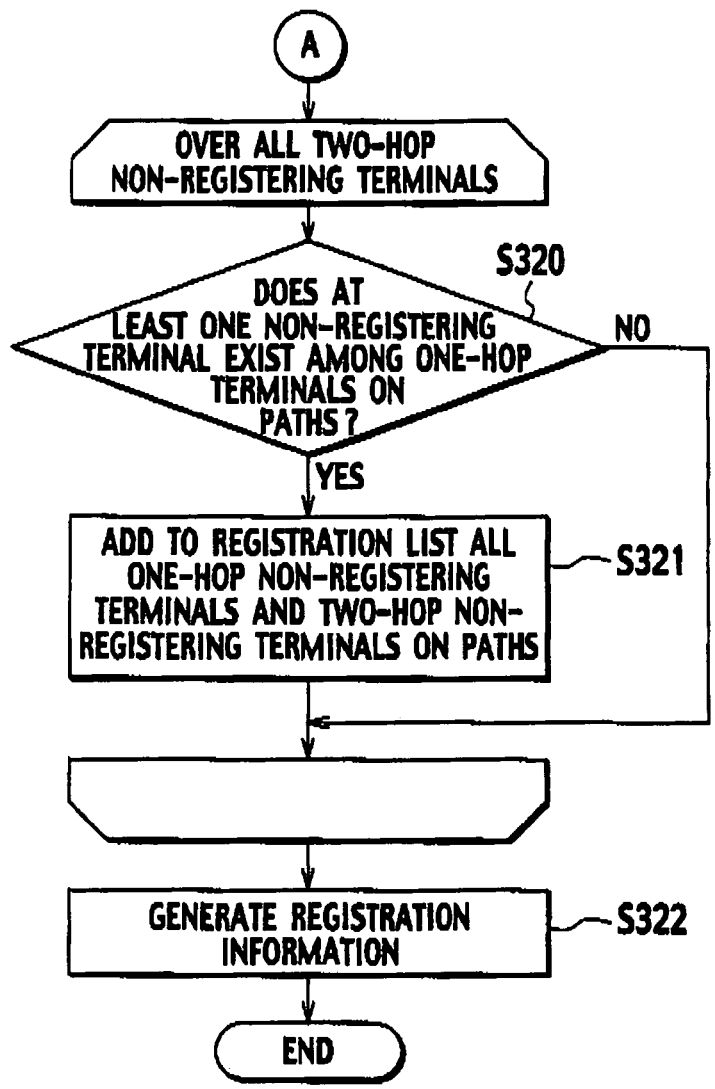
FIG. 12 is flow chart showing the operations of a mobile communication system according to a first modification example of the present invention.

With reference to FIG. 12, a description will be given of a first modification example. A mobile communication system according to the first modification example judges whether or not to add the two-hop non-registering terminal to the registration list by use of the flow chart shown in FIG. 12 instead of the flow chart shown in FIG. 11 used in the mobile communication system according to the above-mentioned first embodiment.

As shown in FIG. 12, the registration information generation unit 13e of the mobile terminal 13 judges over all non-registering terminals (the relevant two-hop non-registering terminals) which are reachable in two hops from the relevant mobile terminal 13, whether or not to add the two-hop non-registering terminals to the registration list by repeating Steps S320 to S321.

In Step S320, the registration information generation 13e of the mobile terminal 13 judges whether or not at least one non-registering terminal exists on all the paths to the mobile terminal (the two-hop non-registering terminal) which is reachable in two hops from the relevant mobile terminal 13.

When the judgment result is negative, the registration information generation unit 13e of the mobile terminal 13 moves on to the judgment on the next two-hop non-registering terminal without registering the relevant two-hop non-registering terminal in the registration list.

On the other hand, when the judgment result is affirmative, the operation moves on to Step S321, and then the registration information generation unit 13e of the mobile terminal 13 adds to the registration list the registration information of the relevant two-hop non-registering terminal and the registration information on all the non-registering terminals (one-hop non-registering terminals) which exist on all the paths to the mobile terminal (the relevant two-hop non-registering terminal) which is reachable in two hops from the relevant mobile terminal 13.

In Step S322, the registration information generation unit 13e of the mobile terminal 13 sends to the server 14 the predetermined registration information and the identification information of the relevant mobile terminal 13 based on the registration list to which the registration information has been added as described above.

Second Embodiment of the Present Invention

With reference to FIGS. 13 to 16, a description will be given of a mobile communication system according to a second embodiment of the present invention.

The mobile communication system according to the second embodiment of the present invention is the same as the mobile communication system according to the above-mentioned first embodiment, except for a point where a judgment unit 13c judges to form "a network configuration in which all mobile terminals adjacent to non-registering terminals are registering terminals".

Figure 13:
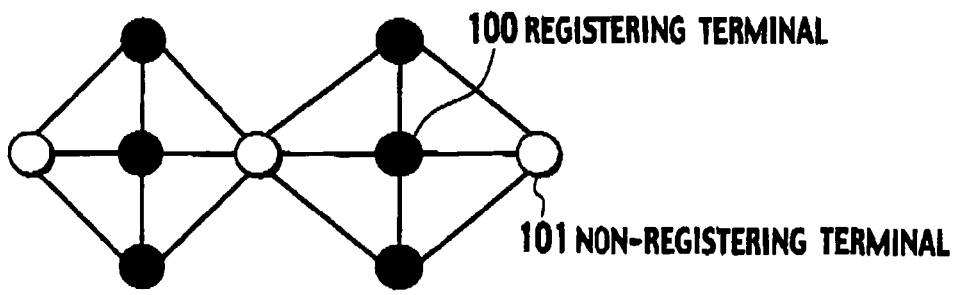
FIG. 13 is a view for explaining a topology in the mobile communication system according to the second embodiment of the present invention.

As shown in FIG. 13, when "the network configuration in which all mobile terminals adjacent to the non-registering terminals are the registering terminals" is realized, the registration information of the non-registering terminals is registered with a server 14 by the registering terminals. Accordingly, the identification information of all the mobile terminals is guaranteed to be registered with the server 14.

Further, the non-registering terminals are not adjacent to each other, and a wireless multi-hop network 10 is not parted. Therefore, in this embodiment, each registering terminal is configured to send only the registration information of an adjacent non-registering terminal to the server 14. Thus, the registration information of a two-hop ahead non-registering terminal is not sent to the server 14.

Note that it is possible to grasp as much as a link state in the mobile terminal which is reachable within two hops by use of a Hello packet.

Firstly, with reference to FIG. 14, a description will be given of the operations of when a mobile terminal 13 operating as the non-registering terminal shifts to the registering terminal.

In this embodiment, the condition that "all mobile terminals adjacent to the non-registering terminal are the registering terminals" is assumed to be satisfied in the wireless multi-hop network 10.

Figure 14:
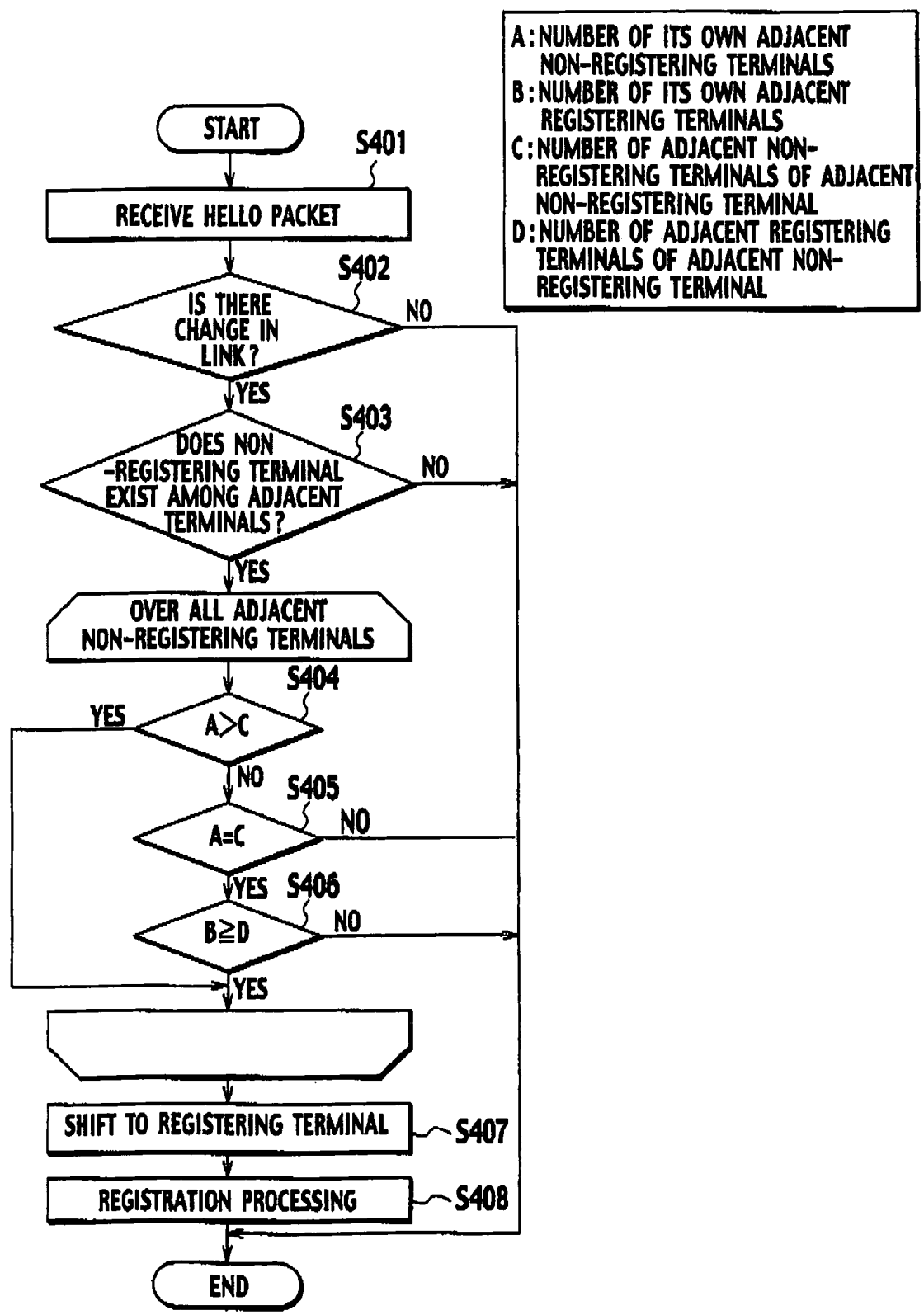
FIG. 14 is a flow chart showing the operations of the mobile communication system according the second embodiment of the present invention.

As shown in FIG. 14, in Step S401, a Hello packet sender/receiver unit 13a of the mobile terminal 13 receives a Hello packet from the adjacent mobile terminal in the wireless multi-hop network 10.

In Step S402, the judgment unit 13c of the mobile terminal 13 judges whether or not there has been a change in a link state in the mobile terminal which is reachable in one hop with reference to the received Hello packet and the link state managed by a link state manager unit 13b.

When there is no change in the link state, the mobile terminal 13 does not shift to the registering terminal, and then the operation is to be terminated. On the other hand, when there is a change in the link state, the operation moves on to Step S403.

In Step S403, the judgment unit 13c of the mobile terminal 13 judges whether or not the non-registering terminal exists among the mobile terminals (adjacent terminals) adjacent to the relevant mobile terminal 13.

When the judgment result is negative, the mobile terminal 13 does not shift to the registering terminal, and the operation is to be terminated.

On the other hand, when the judgment result is affirmative, the judgment unit 13c of the mobile terminal 13 selects the non-registering terminal to shift to the registering terminal based on the number of the adjacent non-registering terminals and the number of the adjacent registering terminals, by repeating Steps S404 to S406, with regard to all adjacent non-registering terminals.

Specifically, in Step S404, the judgment unit 13c of the mobile terminal 13 judges over all adjacent non-registering terminals whether or not the number of the non-registering terminals adjacent to the relevant mobile terminal 13 (the number A of its own adjacent non-registering terminals) is greater than the number of the non-registering terminals adjacent to the non-registering terminal (the adjacent non-registering terminals) which is adjacent to the relevant mobile terminal 13 (the number C of the adjacent non-registering terminals of the adjacent non-registering terminal).

When the judgment result is affirmative, the judgment unit 13c of the mobile terminal 13 moves on to a judgment on the next adjacent non-registering terminal.

On the other hand, when the judgment result is negative, the operation moves on to Step S405. Then, the judgment unit 13c of the mobile terminal 13 judges whether or not the number of the non-registering terminals adjacent to the relevant mobile terminal 13 (the number A of its own adjacent non-registering terminals) is equal to the number of the non-registering terminals adjacent to the non-registering terminals (the adjacent non-registering terminals) which are adjacent to the relevant mobile terminal 13 (the number C of the adjacent non-registering terminals of the adjacent non-registering terminals).

When the judgment result is negative, the operation is to be terminated without the mobile terminal 13's shifting to the registering terminal.

When the judgment result is affirmative, the operation moves on to Step S406. Then, the judgment unit 13c of the mobile terminal 13 judges whether or not the number of the registering terminals adjacent to the relevant mobile terminal 13 (the number B of its own adjacent registering terminals) is equal to or greater the number of the registering terminals adjacent to the non-registering terminal (the adjacent non-registering terminal) which is adjacent to the relevant mobile terminal 13 (the number D of the adjacent registering terminals of the adjacent non-registering terminal).

When the judgment result is negative, the mobile terminal 13 does not shift to the registering terminal, thus terminating the operation. On the other hand, when the judgment result is affirmative, the judgment unit 13c of the mobile terminal 13 moves on to the judgment on the next adjacent non-registering terminal.

When the operation escapes from the loop of Steps S404 to s406 without termination, the judgment unit 13c of the mobile terminal 13 judges that the relevant mobile terminal 13 should shift to the registering terminal in Step S407.

In other words, when the number of the adjacent non-registering terminals of the relevant mobile terminal 13 is greater than the number of the non-registering terminals of all the adjacent non-registering terminals, the judgment unit 13c of the mobile terminal 13 judges that the relevant mobile terminal 13 should shift to the registering terminal in Step S407.

Otherwise, when the number of the adjacent non-registering terminal of the relevant mobile terminal 13 is equal to the number of the non-registering terminals of the adjacent non-registering terminal, and when the number of the adjacent registering terminals of the relevant mobile terminal 13 is greater than the number of the registering terminals of the relevant adjacent non-registering terminal, the judgment unit 13c of the mobile terminal 13 judges that the relevant mobile terminal 13 should shift to the registering terminal in Step S407.

In Step S408, a registration information sender unit 13e of the mobile terminal 13 sends to the server 14 the registration information of the relevant mobile terminal 13, which is generated in a registration information generation unit 13d.

Secondly, with reference to FIG. 15, a description will be given of the operation of when the mobile terminal 13 operating as the registering terminal shifts to the non-registering terminal.

In this embodiment, a condition that "all mobile terminals adjacent to the non-registering terminal are the registering terminals" is assumed to be satisfied in the wireless multi-hop network 10.

Figure 15:
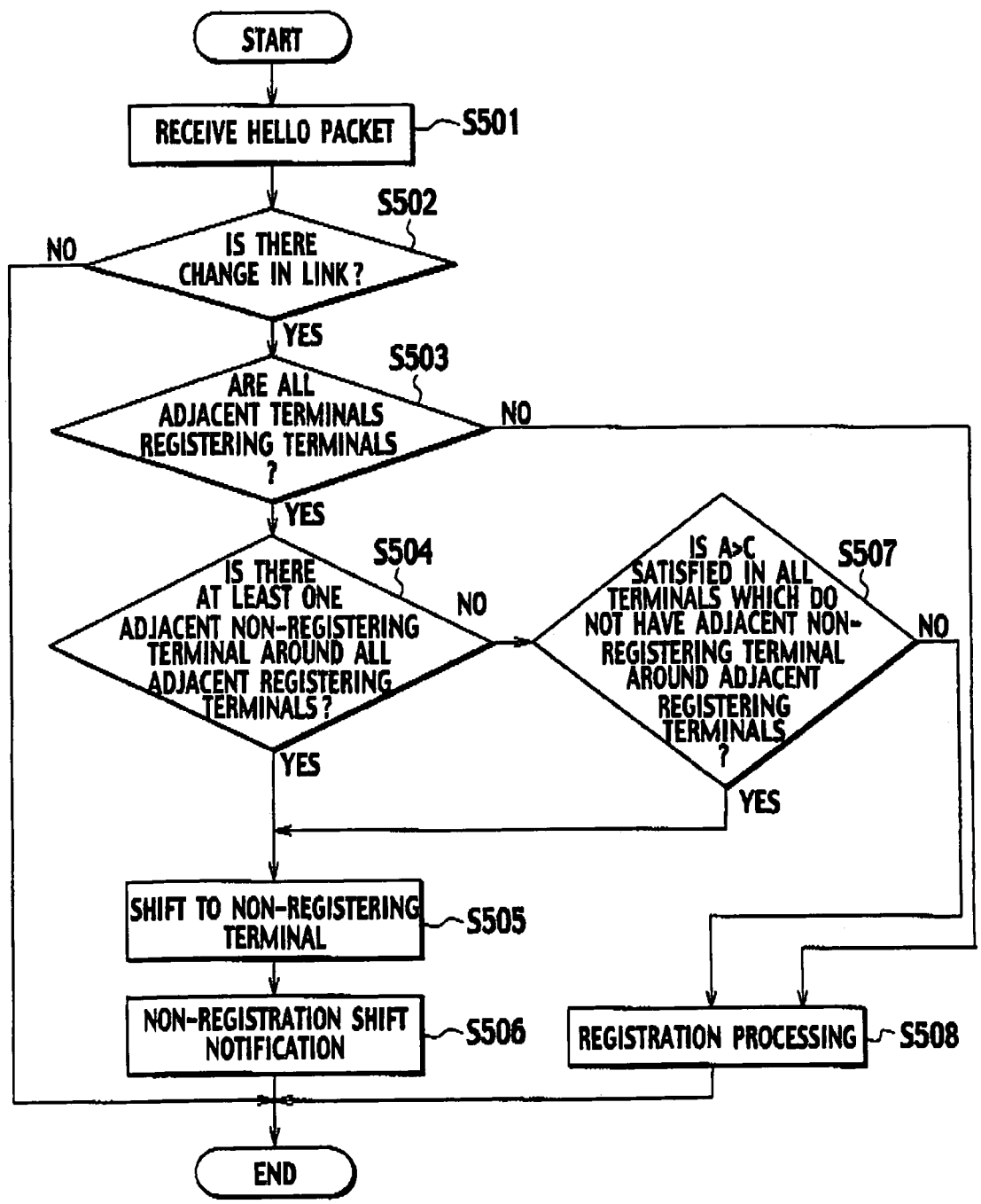
FIG. 15 is a flow chart showing the operations of the mobile communication system according the second embodiment of the present invention.

As shown in FIG. 15, in Step S501, the Hello packet sender/receiver unit 13a of the mobile terminal 13 receives the Hello packet from the adjacent mobile terminal in the wireless multi-hop network 10.

In Step S502, the judgment unit 13c of the mobile terminal 13 judges whether or not there has been a change in the link state in the mobile terminal which is reachable in one hop, with reference to the received Hello packet and the link state managed by the link state manager unit 13b.

When there is no change in the link state, the operation is to be terminated without the mobile terminal 13's shifting to the non-registering terminal. On the other hand, when there is a change in the link state, the operation moves on to Step S503.

In Step S503, the judgment unit 13c of the mobile terminal 13 judges whether or not all mobile terminals adjacent to the relevant mobile terminal 13 (the adjacent terminals) are the registering terminals.

When the judgment result is affirmative, the operation moves on to Step S504. When the judgment result is negative, the operation moves on to Step S508.

In Step S504, the judgment unit 13c of the mobile terminal 13 judges whether or not all the registering terminals adjacent to the relevant mobile terminal 13 (the adjacent registering terminals) are adjacent to at least one non-registering terminal.

When the judgment result is affirmative, the operation moves on to Step S505. When the judgment result is negative, the operation moves on to Step S507.

In Step S505, the adjacent registering terminal cannot become the non-registering terminal to satisfy the above-described conditions. Therefore, the judgment unit 13c of the relevant mobile terminal 13 judges that the relevant mobile terminal 13 should shift to the non-registering terminal.

In Step S506, a non-registration shift notification unit 13f of the relevant mobile terminal 13 notifies the server 14 of the judgment result to that effect.

In Step S507, since there exist a plurality of candidates which can be the non-registering terminal among the adjacent registering terminals, the judgment unit 13c of the relevant mobile terminal 13 judges over all adjacent registering terminals which do not have the adjacent non-registering terminals, whether or not the number of the registering terminals adjacent to the relevant mobile terminal 13 (the number A of its own adjacent registering terminals) is greater than the number of the registering terminals adjacent to the registering terminals (the adjacent registering terminals) adjacent to the relevant mobile terminal 13 (the number B of the adjacent registering terminals of the relevant adjacent registering terminals).

When the judgment result is affirmative, the operation moves on to Step S505. When the judgment result is negative, the operation moves on to Step S508.

In Step S508, the judgment unit 13c of the relevant mobile terminal 13 judges that the relevant mobile terminal 13 should operates as the registering terminal.

Then, the registration information sender unit 13e of the relevant mobile terminal 13 sends the registration information of the relevant mobile terminal 13 to the server 14.

Figure 16:
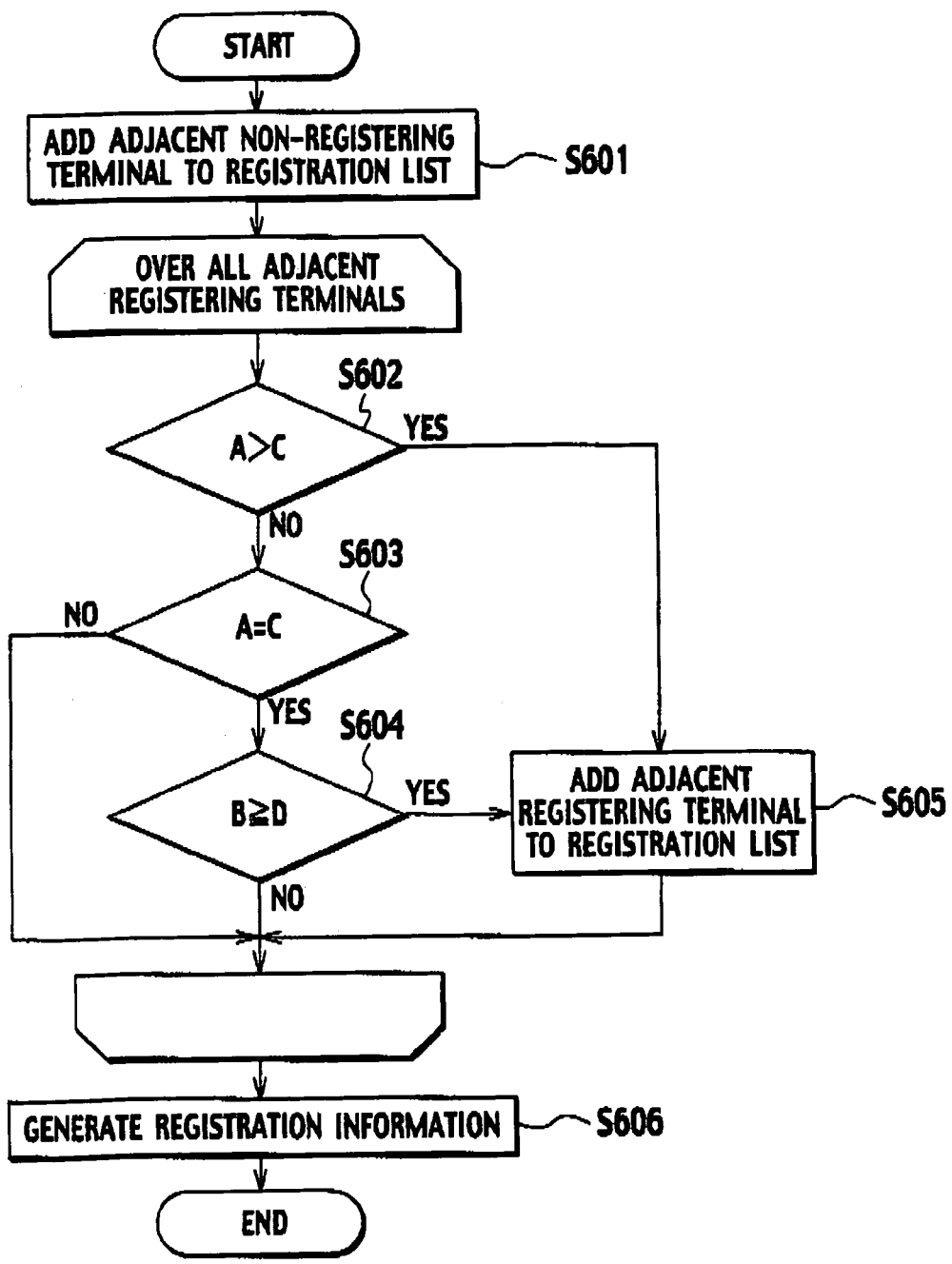
FIG. 16 is a flow chart showing the operations of the mobile communication system according the second embodiment of the present invention.

Thirdly, with reference to FIG. 16, a description will be given of the operations in which the mobile terminal 13 operating as the registering terminal autonomously selects the registration information (the link information and the operational information) to send to the server 14, in order that the information on one link is not redundantly registered with the server 14.

In Step S601, the registration information generation unit 13e (or the registration information sender unit 13d) of the mobile terminal 13 adds the registration information of the non-registering terminal adjacent to the relevant mobile terminal 13 (the adjacent non-registering terminal) to the registration list as the registration information to be sent to the server 14.

Next, the registration information generation unit 13e of the mobile terminal 13 judges over all the adjacent registering terminals whether or not to add the adjacent registering terminals to the registration list by repeating Steps S602 to S605.

Here, when the opposing registering terminals do not register the other's registration information with the server 14 one another, the information on the link between the relevant registering terminals is not registered with the server 14.

On the contrary, when the opposing registering terminals register the other's registration information with the server 14 one another, the information on the link between the relevant registering terminals is redundantly registered with the server 14, which is inefficient. Accordingly, the above-mentioned judgment is required to be made.

In Step S602, the registration information generation unit 13e of the mobile terminal 13 judges whether or not the number of the non-registering terminals adjacent to the relevant mobile terminal 13 (the number A of its own adjacent non-registering terminals) is greater than the number of the non-registering terminals adjacent to the registering terminal (the adjacent registering terminal) which is adjacent to the relevant mobile terminal 13 (the number C of the adjacent non-registering terminals of the adjacent registering terminal).

When the judgment result is affirmative, the operation moves on to Step S605. Then, the registration information generation unit 13e of the mobile terminal 13 adds the registration information of the relevant adjacent registering terminal to the registration list, thus moving on to a judgment on the next adjacent registering terminal.

On the other hand, when the judgment result is negative, the operation moves on to Step S603. The registration information generation unit 13e of the mobile terminal 13 judges whether or not the number of the non-registering terminals adjacent to the relevant mobile terminal 13 (the number A of its own adjacent non-registering terminals) is equal to the number of the non-registering terminals adjacent to the registering terminal (the adjacent registering terminal) which is adjacent to the relevant mobile terminal 13 (the number C of the adjacent non-registering terminals of the adjacent registering terminal).

When the judgment result is negative, the registration information generation unit 13e of the mobile terminal 13 moves on to the judgment on the next adjacent registering terminal without adding the registration information of the relevant adjacent registering terminal to the registration list.

When the judgment result is affirmative, the operation moves on to Step S604. The registration information generation unit 13e of the mobile terminal 13 judges whether or not the number of the registering terminals adjacent to the relevant mobile terminal 13 (the number B of its own adjacent registering terminals) is equal to or greater than the number of the registering terminals adjacent to the registering terminal (the adjacent registering terminal) which is adjacent to the relevant mobile terminal 13 (the number D of the adjacent registering terminals of the adjacent registering terminal).

When the judgment result is negative, the registration information generation unit 13e of the mobile terminal 13 moves on to the judgment on the next adjacent registering terminal without adding the registration information of the relevant adjacent registering terminals to the registration list.

On the other hand, when the judgment result is affirmative, the operation moves on to Step S605. The registration information generation unit 13e of the mobile terminal 13 adds the registration information on the relevant adjacent registering terminal to the registration list, thus moving on to the judgment on the next adjacent registering terminal.

In Step S606, the registration information generation unit 13e of the mobile terminal 13 sends to the server 14 the predetermined registration information and the identification information of the relevant mobile terminal 13, based on the registration list to which the registration information has been added as described above.

Note that in this embodiment, the judgment unit 13c of the mobile terminal 13 does not add the registration information of the non-registering terminals (the two-hop non-registering terminals) which are reachable in two hops from the relevant mobile terminal 13 to the registration list.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile terminal in a mobile communication system in which a server performs routing control based on registration information sent from the plurality of mobile terminals, comprising:

an exchanging unit configured to exchange, with another mobile terminal, link information showing a link set in the another mobile terminal, and operational information showing whether the another mobile terminal is operating as a registering terminal which sends the registration information to the server or the another mobile terminal is operating as a non-registering terminal which does not send the registration information to the server; and a judgment unit configured to make a judgment on whether the mobile terminal should operate as the registering terminal or the mobile terminal should operate as the non-registering terminal, based on the link information and the operational information which are received from the another mobile terminal.

2. The mobile terminal according to claim 1, wherein the judgment unit is configured to make the judgment to form a network configuration in which at least one of the registering terminals is adjacent to the non-registering terminal.

3. The mobile terminal according to claim 2, wherein the judgment unit is configured to judge that the mobile terminal should operate as the registering terminal, when the mobile terminal is the non-registering terminal, when the mobile terminal is not adjacent to the registering terminal, and when all mobile terminals adjacent to the mobile terminal are adjacent to at least one of the registering terminals.

4. The mobile terminal according to claim 2, wherein the judgment unit is configured to judge that the mobile terminal should operate as the registering terminal, when the mobile terminal is the non-registering terminal, when the mobile terminal is not adjacent to the registering terminal, when at least one mobile terminal adjacent to the mobile terminal is not adjacent to the registering terminal, and when the number of the non-registering terminals adjacent to the mobile terminal is greater than the number of the non-registering terminals adjacent to mobile terminals which are not adjacent to the registering terminal adjacent to the mobile terminal.

5. The mobile terminal according to claim 2, wherein the judgment unit is configured to judge that the mobile terminal should operate as the non-registering terminal, when the mobile terminal is the registering terminal, when the mobile terminal is adjacent to at least one of the registering terminals, and when all the non-registering terminals adjacent to the mobile terminal are adjacent to at least two of the registering terminals.

6. The mobile terminal according to claim 2, comprising a registration unit configured to:
send the registration information of the non-registering terminal adjacent to the mobile terminal to the server;
send the registration information of the registering terminal adjacent to the mobile terminal to the server, when the number of the non-registering terminals adjacent to the mobile terminal is greater than the number of the non-registering terminals adjacent to the registering terminals adjacent to the mobile terminal; and
send the registration information of the registering terminal adjacent to the mobile terminal to the server, when the number of the non-registering terminals adjacent to the mobile terminal is equal to the number of the non-registering terminals adjacent to the registering terminal adjacent to the mobile terminal, and when the number of the registering terminals adjacent to the mobile terminal is equal to or greater than the number of the registering terminals adjacent to the registering terminal adjacent to the mobile terminal.

7. The mobile terminal according to claim 2, comprising a registration unit configured to send to the server the registration information of a two-hop mobile terminal which is reachable in two hops from the mobile terminal or of one mobile terminal existing on all paths to the two-hop mobile terminal, when the two-hop mobile terminal is the non-registering terminal which is not reachable in one hop, and when the registering terminal does not exist on all paths to the two-hop mobile terminal.

8. The mobile terminal according to claim 2, comprising a registration unit configured to send to the server the registration information of a two-hop mobile terminal which is reachable in two hops from the mobile terminal and of all the non-registering terminals existing all paths to the two-hop mobile terminal, when the two-hop mobile terminal is the non-registering terminal, and when at least one of the non-registering terminals exists on all paths to the two-hop mobile terminal.

9. The mobile terminal according to claim 1, wherein the judgment unit is configured to make the judgment to form a network configuration in which all mobile terminals adjacent to the non-registering terminal are the registering terminals.

10. The mobile terminal according to claim 9, wherein the judgment unit is configured to select the non-registering terminal to shift to the registering terminal, when the mobile terminal is adjacent to the non-registering terminal.

11. The mobile terminal according to claim 10, wherein the non-registering terminal to shift to the registering terminal is determined based on the number of the adjacent non-registering terminals and the number of the adjacent registering terminals.

12. The mobile terminal according to claim 9, wherein the judgment unit is configured to judge that the mobile terminal should operate as the non-registering terminal, when the mobile terminal is the registering terminal, when all mobile terminals adjacent to the mobile terminal are the registering terminals, and when all the registering terminals adjacent to the mobile terminal are adjacent to at least one of the non-registering terminals.

13. The mobile terminal according to claim 9, wherein the judgment unit is configured to judge that the mobile terminal should operate as the non-registering terminal, when the mobile terminal is the registering terminal, when all mobile terminals adjacent to the mobile terminal are the registering terminals, when at least one mobile terminal adjacent to the mobile terminal is not adjacent to the non-registering terminal, and when the number of the registering terminals adjacent to the mobile terminal is greater than the number of the registering terminals adjacent to the registering terminal adjacent to the mobile terminal.

14. The mobile terminal according to claim 9, comprising a registration unit configured to:
send to the server the registration information of the non-registering terminal adjacent to the mobile terminal;
send to the server the registration information of the registering terminal adjacent to the mobile terminal, when the number of the non-registering terminals adjacent to the mobile terminal is greater than the number of the non-registering terminals adjacent to the registering terminal adjacent to the mobile terminal; and
send to the server the registration information of the registering terminal adjacent to the mobile terminal, when the number of the non-registering terminals adjacent to the mobile terminal is equal to the number of the non-registering terminals adjacent to the registering terminal adjacent to the mobile terminal, and when the number of the registering terminals adjacent to the mobile terminal is equal to or greater than the number of the registering terminals adjacent to the registering terminal adjacent to the mobile terminal.

15. A mobile communication method, comprising:
causing a mobile terminal to exchange, with another mobile terminal, link information showing a link set in the another mobile terminal, and operational information showing whether the another mobile terminal is operating as a registering terminal which sends the registration information to a server or the another mobile terminal is operating as a non-registering terminal which does not send the registration information to the server;
causing the mobile terminal to make a judgment on whether the mobile terminal should operate as the registering terminal or the mobile terminal should operate as the non-registering terminal, based on the link information and the operational information which have been received from the another mobile terminal; and
causing the server to perform routing control based on the registration information sent from the registering terminal.

* * * * *